United States Patent [19]
Bird et al.

[11] Patent Number: 5,454,638
[45] Date of Patent: Oct. 3, 1995

[54] ADJUSTABLE REFRIGERATOR SHELVING

[75] Inventors: Kevin C. Bird, Holland; Robert S. Herrmann, Grand Haven, both of Mich.

[73] Assignee: Donnelly Technology, Inc., Holland, Mich.

[21] Appl. No.: 391,640

[22] Filed: Feb. 21, 1995

Related U.S. Application Data

[63] Continuation of Ser. No. 989,087, Dec. 11, 1992, abandoned, which is a continuation-in-part of Ser. No. 665,661, Mar. 7, 1991, Pat. No. 5,362,145, which is a continuation-in-part of Ser. No. 721,104, Jun. 25, 1991, Pat. No. 5,273,354, and a continuation-in-part of Ser. No. 912,778, Jul. 13, 1992, Pat. No. 5,403,084.

[51] Int. Cl.$^6$ ........................................................ A47B 9/00
[52] U.S. Cl. ............................ 312/408; 108/108; 211/193
[58] Field of Search ............................ 271/94, 193, 190, 271/94.5; 108/108; 248/243; 312/408, 400, 116

[56] References Cited

U.S. PATENT DOCUMENTS

| | | |
|---|---|---|
| 247,039 | 9/1881 | Gerow. |
| D. 295,950 | 5/1988 | Johnston. |
| D. 310,623 | 9/1990 | Aranibar. |
| 392,061 | 10/1888 | Peckham. |
| 560,884 | 5/1896 | Anderson. |
| 786,935 | 4/1905 | Wright. |
| 870,439 | 11/1907 | Kade. |
| 894,711 | 7/1908 | Worcester. |
| 907,423 | 12/1908 | Tilley. |
| 1,119,982 | 12/1914 | Ohnstrand. |
| 1,774,312 | 8/1930 | Braeutigam. |
| 1,779,236 | 10/1930 | Hoegger. |
| 1,961,391 | 6/1934 | Reedy et al. |
| 1,973,829 | 9/1934 | Tobold. |
| 1,983,470 | 12/1934 | Knape. |
| 2,065,391 | 12/1936 | Nance. |

(List continued on next page.)

FOREIGN PATENT DOCUMENTS

| | | |
|---|---|---|
| 638205 | 10/1963 | Belgium. |
| 651228 | 7/1964 | Belgium. |
| 632642 | 12/1961 | Canada. |
| 711879 | 6/1965 | Canada. |
| 780197 | 3/1968 | Canada. |
| 157461 | 10/1985 | European Pat. Off.. |
| 1346778 | 11/1963 | France. |
| 2111257 | 6/1972 | France. |
| 2269891 | 12/1975 | France. |
| 711920 | 9/1941 | Germany. |
| 2629118 | 1/1978 | Germany. |
| 85357952 | 3/1986 | Germany. |
| 90065131 | 9/1990 | Germany. |
| 90041801 | 9/1991 | Germany. |
| 202774 | 3/1966 | Sweden. |
| 320487 | 11/1929 | United Kingdom. |
| 324990 | 2/1930 | United Kingdom. |
| 908454 | 10/1962 | United Kingdom. |
| 1002175 | 8/1965 | United Kingdom. |
| 1020988 | 2/1966 | United Kingdom. |
| 1168332 | 10/1969 | United Kingdom. |
| 1191596 | 5/1970 | United Kingdom. |

Primary Examiner—Kenneth J. Dorner
Assistant Examiner—Gerald A. Anderson
Attorney, Agent, or Firm—Price, Heneveld, Cooper, DeWitt & Litton

[57] ABSTRACT

Adjustable refrigerator shelving includes a shelf rail for supporting a partial width shelf within a refrigerated compartment on first and second, spaced shelf tracks vertically oriented in the compartment. The tracks releasably engage with a number of support brackets for cantilevered support of one or more shelves at a plurality of vertically spaced locations. The shelf rail is adapted for releasable engagement with the shelf tracks and is interposed between the partial shelf and the shelf tracks for horizontally adjustable support of the partial shelf. The shelf rail includes rearwardly projecting hooks at each of two opposing ends for releasable engagement with the shelf tracks. Locking tabs may be included on the hooks to retain the shelf rail on the tracks, while a rub strip is provided between the partial shelf and the shelf rail, along a top edge of the shelf rail.

51 Claims, 8 Drawing Sheets

U.S. PATENT DOCUMENTS

| | | | |
|---|---|---|---|
| 2,092,430 | 9/1937 | Stratton . | |
| 2,093,137 | 9/1937 | Reeves . | |
| 2,144,602 | 1/1939 | Balmer . | |
| 2,169,295 | 8/1939 | Shuart | 211/153 |
| 2,197,982 | 4/1940 | O'Brien | 211/153 |
| 2,252,997 | 8/1941 | Vanderveld | 248/243 |
| 2,505,322 | 4/1950 | Drake . | |
| 2,505,322 | 4/1950 | Drake | 62/89 |
| 2,537,804 | 1/1951 | Watkins | 20/56.5 |
| 2,551,062 | 5/1951 | Skar . | |
| 2,568,153 | 9/1951 | Hickman | 211/153 |
| 2,599,607 | 6/1952 | Burrise . | |
| 2,599,607 | 6/1952 | Burrise | 211/153 |
| 2,604,375 | 7/1952 | Beckett | 312/351 |
| 2,613,818 | 10/1952 | Richard | 211/153 |
| 2,626,773 | 1/1953 | Backman | 248/239 |
| 2,657,894 | 11/1953 | Sklenar | 248/239 |
| 2,678,793 | 5/1954 | Brochstein | 248/243 |
| 2,681,786 | 6/1954 | Sparring | 248/243 |
| 2,689,778 | 9/1954 | Chambers et al. | 312/351 |
| 2,735,741 | 2/1956 | Laben | 312/351 |
| 2,739,777 | 3/1956 | Schoenhardt | 248/243 |
| 2,786,729 | 3/1957 | Fields . | |
| 2,787,382 | 4/1957 | Williams . | |
| 2,834,478 | 5/1958 | Macdonald . | |
| 2,845,187 | 7/1958 | Bianchi . | |
| 2,857,227 | 10/1958 | Jacques . | |
| 2,954,125 | 9/1960 | Husted | 211/90 |
| 2,956,688 | 10/1960 | Galassi . | |
| 2,975,908 | 3/1961 | Huet . | |
| 3,044,632 | 7/1962 | Schild . | |
| 3,044,634 | 7/1962 | Oztekin . | |
| 3,067,882 | 12/1962 | Ribbens et al. . | |
| 3,082,880 | 3/1963 | Mapson | 211/153 |
| 3,092,047 | 6/1963 | Chesley | 108/137 |
| 3,102,499 | 9/1963 | Shelor | 108/28 |
| 3,108,455 | 10/1963 | Hansen . | |
| 3,112,912 | 12/1963 | Alvarez . | |
| 3,120,077 | 2/1964 | Stoffel . | |
| 3,127,146 | 3/1964 | Fisher | 248/250 |
| 3,167,037 | 1/1965 | Mapson . | |
| 3,185,315 | 5/1965 | Andreassen | 211/153 |
| 3,196,812 | 7/1965 | Jacques . | |
| 3,212,836 | 10/1965 | Johnson | 312/351 |
| 3,234,897 | 2/1966 | Berk . | |
| 3,247,973 | 4/1966 | Ruhnke . | |
| 3,264,049 | 8/1966 | Peterson . | |
| 3,270,404 | 9/1966 | Andreassen | 29/160 |
| 3,294,351 | 12/1966 | Rollins, Jr. . | |
| 3,308,961 | 3/1967 | Chesley . | |
| 3,321,089 | 5/1967 | Krikorian . | |
| 3,329,281 | 7/1967 | Ball . | |
| 3,331,646 | 7/1967 | Peters | 312/270 |
| 3,334,954 | 8/1967 | Kesling . | |
| 3,339,994 | 9/1967 | Reddig et al. . | |
| 3,352,431 | 11/1967 | Smith | 211/176 |
| 3,358,956 | 12/1967 | Thornton . | |
| 3,363,390 | 1/1968 | Crane et al. . | |
| 3,421,803 | 1/1969 | Lustig . | |
| 3,429,628 | 2/1969 | Laszlo | 312/214 |
| 3,446,361 | 5/1969 | Douty | 211/153 |
| 3,511,193 | 5/1970 | Schild . | |
| 3,554,383 | 1/1971 | Ball . | |
| 3,561,714 | 2/1971 | Zurawski et al. | 248/243 |
| 3,570,798 | 3/1971 | Squibb . | |
| 3,575,484 | 4/1971 | Kesling | 312/330 |
| 3,603,274 | 9/1971 | Ferdinand et al. | 108/108 |
| 3,604,669 | 9/1971 | Asher | 248/243 |
| 3,633,983 | 1/1972 | Whitcomb | 312/306 |
| 3,635,355 | 1/1972 | Kronenberger . | |
| 3,637,085 | 1/1972 | Ball . | |
| 3,672,624 | 6/1972 | Keller | 248/243 |
| 3,701,325 | 10/1972 | Fenwick . | |
| 3,712,698 | 6/1973 | Propst et al. . | |
| 3,730,477 | 5/1973 | Wavrunek . | |
| 3,859,932 | 1/1975 | Armstrong et al. . | |
| 3,862,784 | 1/1975 | Heinrich . | |
| 3,865,448 | 2/1975 | Winterheimer . | |
| 3,877,767 | 4/1975 | Bright . | |
| 3,912,085 | 10/1975 | Cooke et al. . | |
| 3,984,163 | 10/1976 | Boorman, Jr. et al. . | |
| 3,986,758 | 10/1976 | Heaney . | |
| 3,993,002 | 11/1976 | Stroh . | |
| 4,015,543 | 4/1977 | Stankowitz . | |
| 4,018,019 | 4/1977 | Raith | 248/243 |
| 4,018,167 | 4/1977 | Spangler . | |
| 4,051,789 | 10/1977 | Howitt . | |
| 4,072,340 | 2/1978 | Morgan . | |
| 4,086,858 | 5/1978 | Howitt . | |
| 4,098,481 | 7/1978 | Johnson et al. . | |
| 4,139,234 | 2/1979 | Morgan . | |
| 4,165,852 | 8/1979 | Chervenak . | |
| 4,167,259 | 9/1979 | Bury . | |
| 4,174,486 | 11/1979 | Winkler . | |
| 4,183,487 | 1/1980 | Swain . | |
| 4,190,305 | 2/1980 | Knight et al. . | |
| 4,212,402 | 7/1980 | Kelly et al. . | |
| 4,228,906 | 10/1980 | Jones . | |
| 4,274,687 | 6/1981 | Bayles et al. . | |
| 4,312,086 | 1/1982 | Bianco . | |
| 4,320,935 | 3/1982 | Nagelkirk . | |
| 4,349,113 | 9/1982 | Schreiner . | |
| 4,401,222 | 8/1983 | Kulikowski et al. . | |
| 4,416,380 | 11/1983 | Flum . | |
| 4,429,850 | 2/1984 | Weber et al. . | |
| 4,462,646 | 7/1984 | Fleck . | |
| 4,509,652 | 4/1985 | Arney . | |
| 4,543,283 | 9/1985 | Curtze et al. . | |
| 4,548,327 | 10/1985 | Kilkelly . | |
| 4,591,058 | 5/1986 | Amstutz et al. . | |
| 4,601,226 | 7/1986 | McClintock . | |
| 4,603,781 | 8/1986 | Ryan, Jr. . | |
| 4,605,988 | 8/1986 | Nienhuis et al. . | |
| 4,618,192 | 10/1986 | Kelley . | |
| 4,629,076 | 12/1986 | Amstutz et al. . | |
| 4,634,010 | 1/1987 | Otema . | |
| 4,678,151 | 7/1987 | Radek . | |
| 4,679,368 | 7/1987 | Pettinga et al. . | |
| 4,685,255 | 8/1987 | Kelley . | |
| 4,697,712 | 10/1987 | Valiulis . | |
| 4,718,132 | 1/1988 | Wirland . | |
| 4,723,809 | 2/1988 | Kida et al. . | |
| 4,729,613 | 3/1988 | Tromble et al. . | |
| 4,735,325 | 4/1988 | Remmers . | |
| 4,735,470 | 4/1988 | Falk . | |
| 4,736,918 | 4/1988 | Bessinger . | |
| 4,736,997 | 4/1988 | Besore et al. . | |
| 4,760,930 | 8/1988 | Fox . | |
| 4,777,888 | 10/1988 | Waterman et al. . | |
| 4,779,939 | 10/1988 | Stich . | |
| 4,805,863 | 2/1989 | Armstrong et al. . | |
| 4,822,656 | 4/1989 | Hutter, III . | |
| 4,841,698 | 6/1989 | Gold . | |
| 4,843,977 | 7/1989 | Bridges . | |
| 4,870,907 | 10/1989 | McKee . | |
| 4,872,567 | 10/1989 | Bustos . | |
| 4,884,702 | 12/1989 | Rekow . | |
| 4,890,746 | 1/1990 | Trulaske, Sr. . | |
| 4,923,260 | 5/1990 | Poulsen . | |
| 4,934,541 | 6/1990 | Bussan et al. . | |
| 4,934,642 | 6/1990 | Baron et al. . | |
| 4,938,447 | 7/1990 | Mastrodicasa . | |

| | | | | | |
|---|---|---|---|---|---|
| 4,955,486 | 9/1990 | Trulaske, Sr. . | 5,074,422 | 12/1991 | Holtz . |
| 5,004,202 | 4/1991 | Stumpf et al. . | 5,076,443 | 12/1991 | Trulaske, Sr . |
| 5,004,302 | 4/1991 | Stocking et al. . | 5,121,698 | 6/1992 | Kelley . |
| 5,069,408 | 12/1991 | Bessinger . | 5,123,549 | 6/1992 | Finses et al. . |

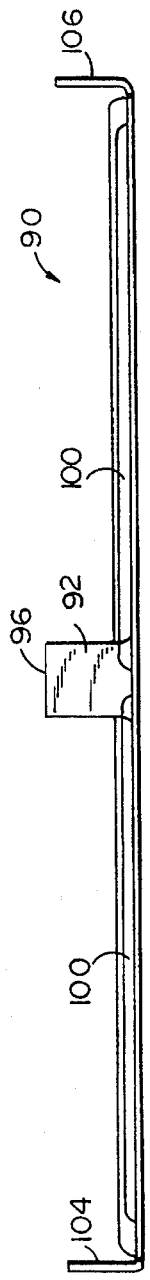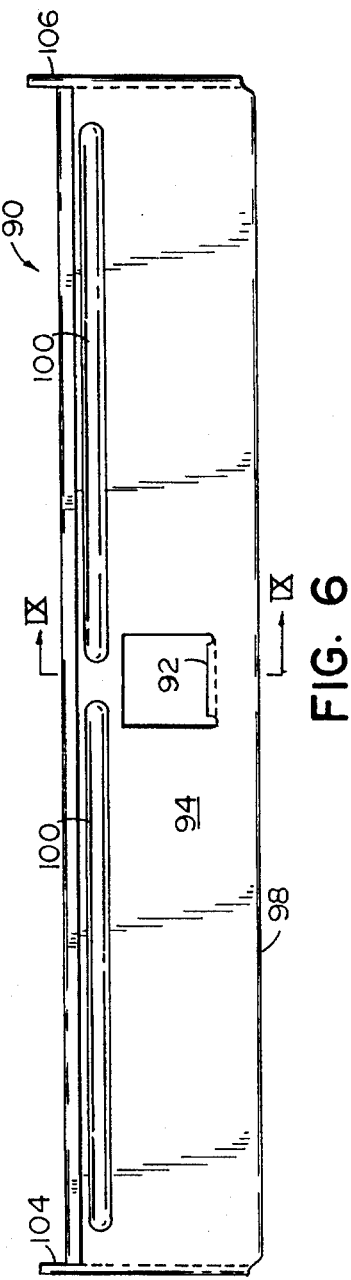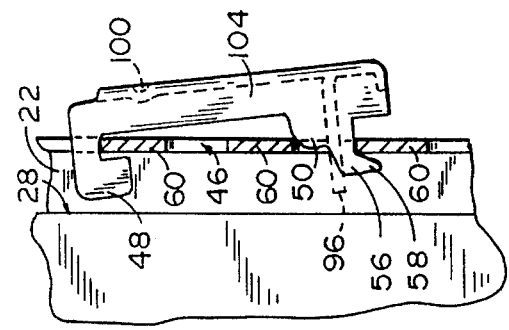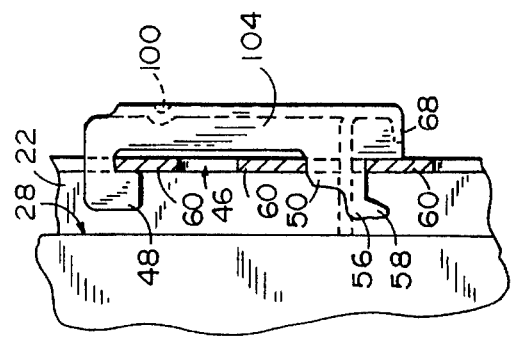

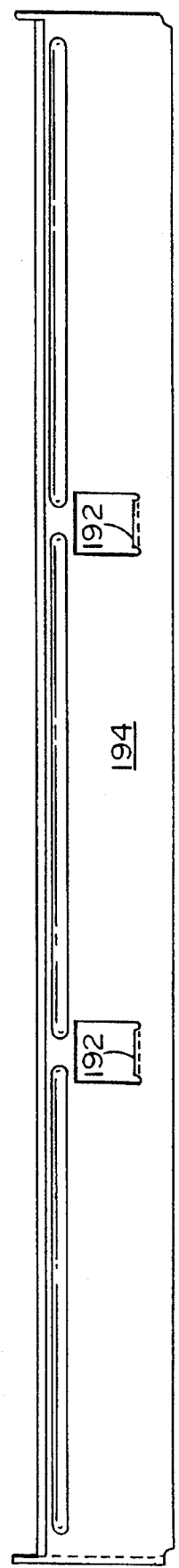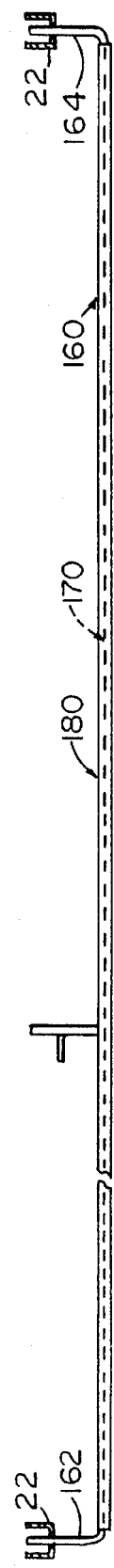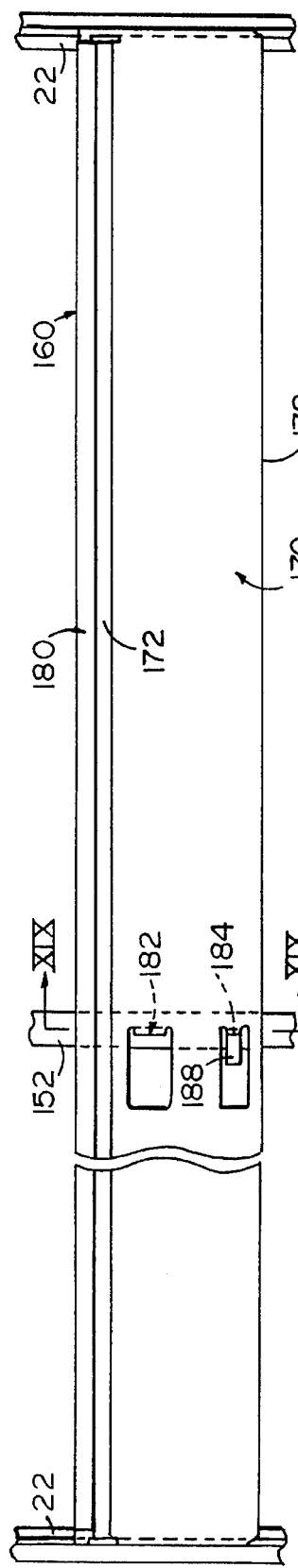

5,454,638

ADJUSTABLE REFRIGERATOR SHELVING

CROSS REFERENCE TO REALTED APPLICATIONS

This is a continuation of application Ser. No. 07/989,087, filed Dec. 11, 1992, abandoned, which is a continuation-in-part of U.S. patent application Ser. No. 07/665,661, entitled MOLDED REFRIGERATOR SHELF and filed on Mar. 7, 1991, by Bird et al., now U.S. Pat. No. 5,362,145 the disclosure of which is incorporated herein by reference; U.S. patent application Ser. No. 07/721,104, entitled MOLDED REFRIGERATOR SHELF AND SUPPORT BRACKET and filed on Jun. 25, 1991, by Herrmann et al., now U.S. Pat. No. 5,273,354, the disclosure of which is hereby incorporated by reference; and U.S. patent application Ser. No. 07/912,778, entitled MOLDED REFRIGERATOR SHELF WITH SNAP-IN SLIDE and filed on Jul. 13, 1992, by Kane et al., now U.S. Pat. No. 5,403,084 the disclosure of which is incorporated herein by reference.

BACKGROUND OF THE INVENTION

This invention relates to shelving for refrigerators and the like.

A basic refrigerator cabinet is typically provided with two compartments, namely a freezer compartment and a refrigerator compartment. These compartments are commonly arranged as either a "top mount" or a "side-by-side" cabinet. In the top mount arrangement, the two compartments are stacked vertically, one upon the other, and each compartment extends fully across the width of the refrigerator cabinet. In the side-by-side arrangement, each of the compartments commonly extends the full height and only partially across the width of the refrigerator cabinet. The side-by-side arrangement is a relatively more recent development to enhance storage and provide a user with a choice for refrigerated storage.

The use of shelving for refrigerators has generally evolved from providing no shelving in the freezer compartment and only fixed shelving in the refrigerated compartment to the use of vertically adjustable, tempered glass shelves, and the like, which are cantilevered from adjustable shelf tracks mounted on a back wall of each compartment. Typically, these shelves extend across the full width of the respective compartment. Particularly in top mount refrigerators, shelving and storage versatility has been further enhanced with a variety of specialty shelves, configured for specific storage tasks. The simplest and most common of these adaptations is the use of a center shelf track for supporting half width shelves in either of a left or right half of the compartment.

While these prior advances in refrigerator shelving design have enhanced refrigerated storage versatility, there is still significant inefficiency when tall beverage containers and the like are positioned on or under the known refrigerator shelving. It is inherent that the spacing between refrigerator shelves is dictated by the tallest object placed on or under any given shelf. This often results in one or a few tall containers dictating a large shelf spacing with the common result of inefficient use of refrigerated space because the remainder of that shelf space is shared with shorter items. Alternatively, shorter items may be stacked or balanced upon each other in the remainder of that shelf space with the unavoidable result that these stacked items will be jostled and fall during the course of retrieval and replacement of items from the refrigerator.

The need was, therefore, apparent for a refrigerator shelving system which would provide needed adjustability with accompanying efficiency in utilization of refrigerator or freezer compartment space for both large and small, short and tall items.

SUMMARY OF THE INVENTION

Accordingly, the present invention provides an adjustable shelf rail to support a partial shelf in a refrigerator or freezer compartment for tiered storage of short items next to tall items in the refrigerator or freezer. The shelf rail is releasably mountable to the horizontally spaced shelf tracks typically provided in a refrigerator, at the plurality of vertically spaced positions allowed by those shelf tracks. Further, the partial shelf extends less than fully across the width of a refrigerator compartment.

In one aspect of the invention, the partial shelf may be positioned horizontally at any desired location along a length of the shelf rail. In another aspect, the shelf rail is positively locked in place on the shelf tracks. Further, rotation of the shelf rail out of engagement with the shelf tracks is limited by a stop hook. The shelf rail is also provided with a wear member positioned between the partial shelf and the shelf rail.

In yet another aspect of the invention, the partial shelf has a molded, spill-resistant perimeter rim. The molded rim both maximizes spill retention capability of the shelf and minimizes potential for inaccessible entrapment of a spilled material between the perimeter rim and a shelf panel of the partial shelf. In a further aspect, the perimeter rim is molded around at least a portion of a supporting shelf bracket to assure secure and durable attachment with the shelf bracket. The shelf support bracket is releasably connected with the shelf rail by a locking hook which limits rotation of the partial shelf relative to the shelf rail.

Thus, the present invention provides enhanced refrigerator or freezer storage, overcoming inherent limitations of prior shelving systems, and furnishes a shelving system which flexibly and efficiently stores both large and small, short and tall items. This invention is easily implemented in existing or in new shelving systems.

These and other objects, advantages and features of the present invention will become apparent upon review of the following specification in conjunction with the drawings.

BRIEF DESCRIPTION OF THE DRAWINGS

FIG. 6 is a front elevational view of a second embodiment of a shelf rail according to the present invention;

FIG. 7 is a top plan view of the shelf rail of FIG. 6;

FIG. 8 is an end elevation shown partially in section of the shelf rail of FIG. 6 engaged with a shelf track;

FIG. 8A is a view similar to that in FIG. 8 showing the shelf rail in a disengaged position;

FIG. 17 is a front elevational view of the shelf rail of FIG. 16;

FIG. 18 is a top plan view of the shelf rail of FIG. 16;

FIG. 20 is a front elevational view of a fourth, extended length embodiment of a shelf rail according to the present invention.

DESCRIPTION OF THE PREFERRED EMBODIMENT

Figure 1:
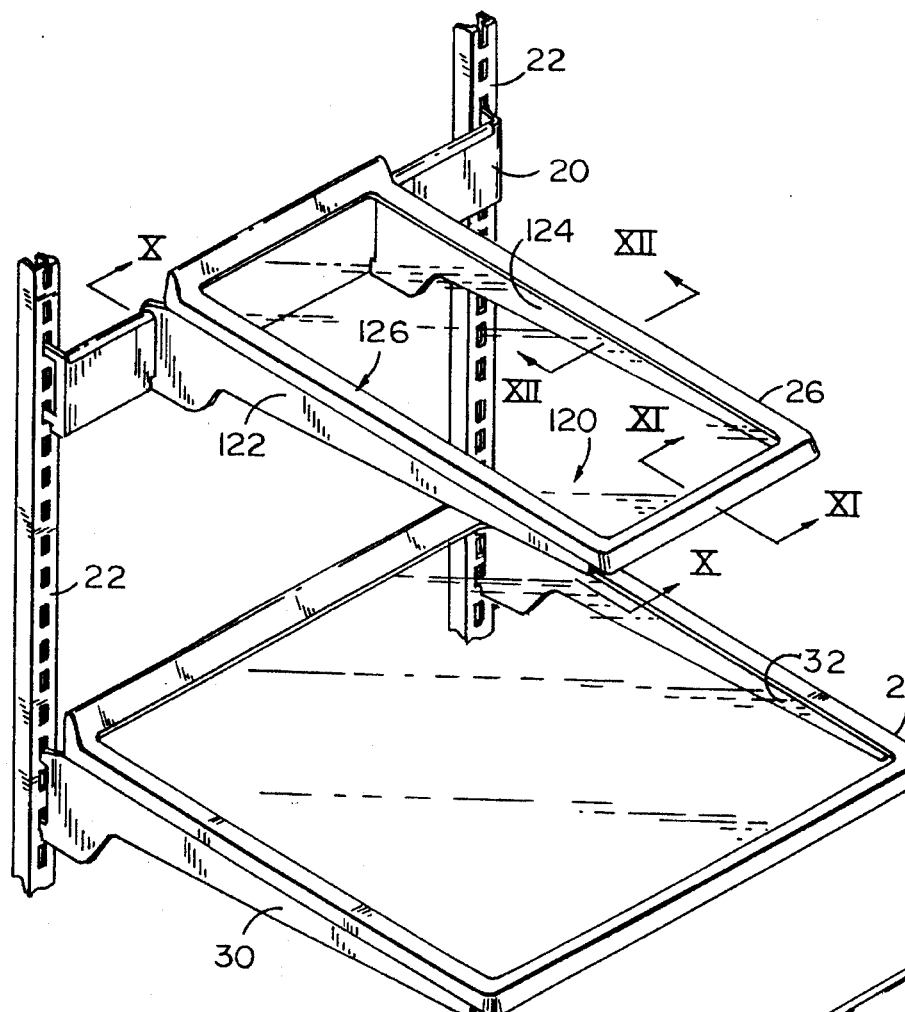
FIG. 1 is a perspective view of a first refrigerator shelf arrangement according to the present invention.

Referring now to the drawings in greater detail, FIG. 1 shows a first shelf arrangement according to the invention including a shelf rail 20, adjustable shelf tracks 22, a full shelf 24, and a partial shelf 26.

Figure 2:
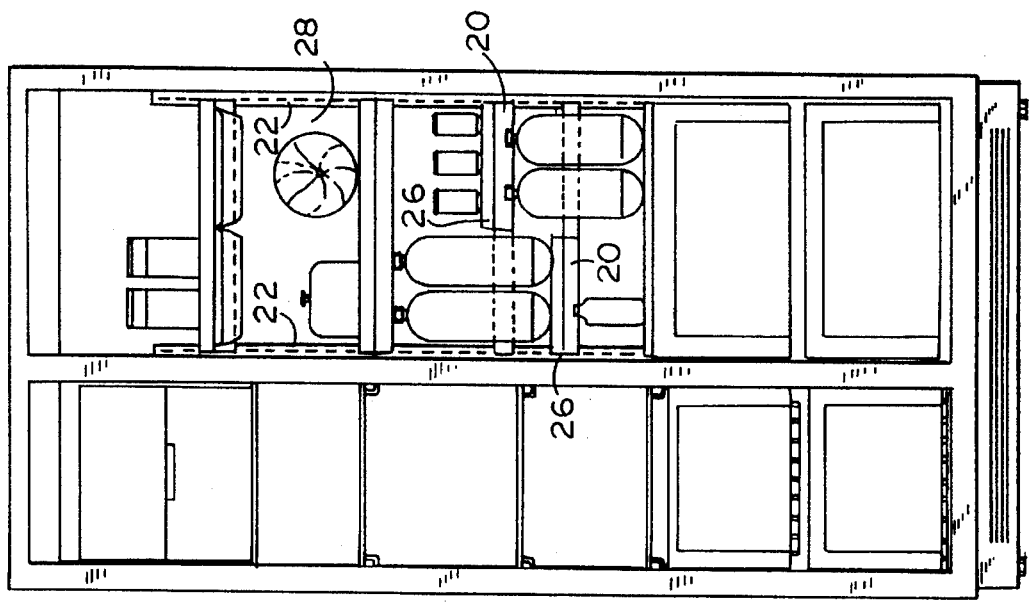
FIG. 2 is a front elevational view of the interior of a side-by-side refrigerator showing the present invention.
Figure 15:
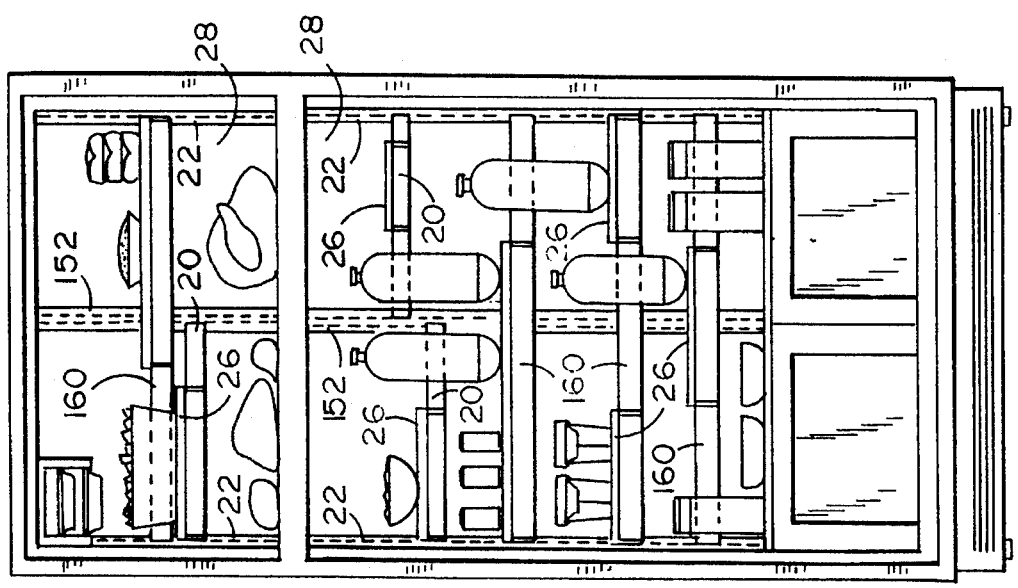
FIG. 15 is a front elevational view of the interior of a top mount refrigerator showing the present invention.

Adjustable shelf tracks 22 are common refrigerator or freezer hardware, vertically oriented, horizontally spaced, and mounted on a back wall 28 of a refrigerator or freezer compartment by bolts or screws as is commonly known (FIGS. 2 and 15). Tracks 22 are typically U-shaped metal or plastic channels which include vertically spaced, aligned slots or holes 46 in their outwardly facing surfaces. The slots or holes 46 provide releasable engagement with the hook-shaped ends or flanges of shelf support brackets 30 and 32 for cantilever support of shelves 24 at various vertically spaced locations.

Figure 3:
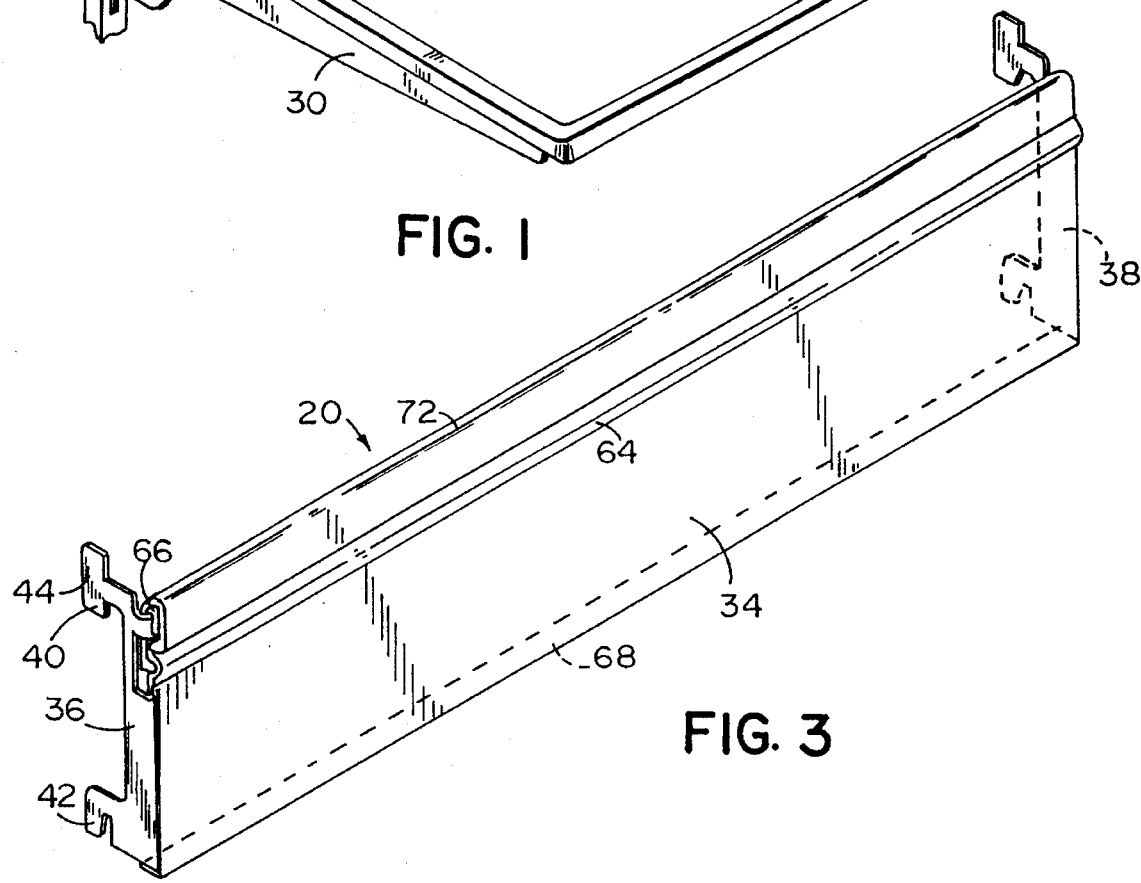
FIG. 3 is a perspective view of a shelf rail according to the present invention.
Figure 4:
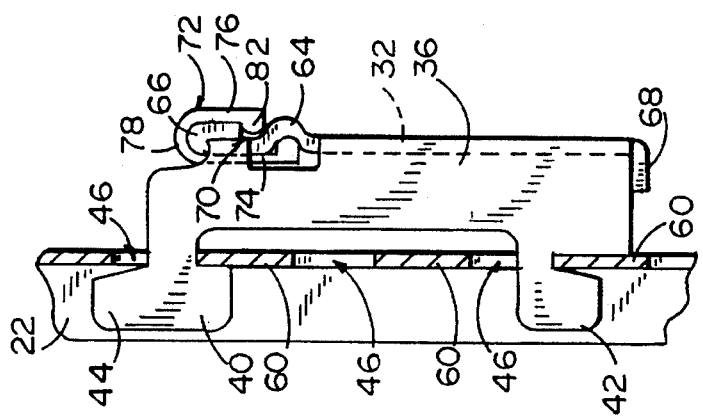
FIG. 4 is an end elevational view of the shelf rail of FIG. 3 shown mounted on a typical shelf track of the type used in refrigerator/freezer compartments.

Now referring to FIGS. 3 and 4, shelf rail 20 is preferably formed from 14-gauge steel and subsequently powder-coated as is commonly known in the trade for refrigerator components. Shelf rail 20 has an elongated body 34 with rearwardly extending flanges 36 and 38 at each of two opposing ends. Each flange 36, 38 is provided with a pair of vertically spaced mounting hooks 40 and 42 for engaging the slots 46 provided in shelf tracks 22 (FIG. 4). A positive locking tab 44 is also provided on mounting hook 40 (FIGS. 3 and 4). Locking tab 44 projects generally upward from mounting hook 40 to minimize accidental disengagement of shelf rail 20 from slots 46 in shelf tracks 22.

In an alternative configuration of the ends of shelf rail 20 (FIG. 5), each flange 36, 38 is provided with a mounting hook 48. An alternative locking tab 50 is also provided on each flange 36, 38 spaced vertically below hook 48. Tab 50 engages and substantially fills a track slot 46 or is at least positioned near a top edge 52 of a track slot 46. Thus, tab 50 has a top surface 54 adjacent top edge 52 of slot 46 so that top surface 54 will abut top edge 52 if shelf rail 20 is lifted vertically when tab 50 is engaged with shelf track 22 to preclude lifting shelf rail 20 and the disengagement and removal of mounting hook 48 from shelf track 22.

Alternative locking tab 50 (FIG. 5) is also provided with a stop hook 56 having a leg 58. Leg 58 extends away from tab top surface 54 for engaging a rung 60 of shelf tracks 22 and limiting rotation of shelf rail 20 to a position in which alternative locking tab 50 is disengaged from slot 46 and positioned adjacent to shelf track 22. Further, a stop 62 may be formed on and project upward from tab top surface 54 or may be omitted as shown in FIGS. 8 and 8A.

Stop 62 is positioned away from rail body 34 and sized for force fit engagement of tab 50 with a slot 46 of shelf tracks 22. Thus, once shelf rail 20 is mounted on shelf tracks 22, stop 62 will resist disengagement of tab 50 from its respective slot 46. However, if shelf rail 20 is rotated to force stop 62 through slot 46 and disengage tab 50, leg 58 of stop hook 56 will engage the next lower adjoining rung 60 of shelf track 22 to positively limit further rotation of shelf rail 20 and position tab 50 adjacent to, but disengaged from, shelf track 22. Shelf rail 20 can then only be removed by lifting the entire rail and further rotating the rail to disengage tab 50 from slot 46 after which hook 48 may also be disengaged from the upper slot.

In a further alternative embodiment of the mounting hooks on end flanges 36, 38 shown in FIGS. 8, 8A, the end flange configuration is basically similar to that shown in FIG. 5 and again has a mounting hook 48 near top edge 66, a locking tab 50, and a stop hook 56 with a leg 58. However, stop 62 is omitted thereby making installation of shelf rail 20 easier, and also facilitating rotation of shelf rail 20 from a fully engaged position (FIG. 8) to a position where tab 50 is disengaged from shelf track 22 and positioned adjacent to the shelf track (FIG. 8A).

Figure 5:
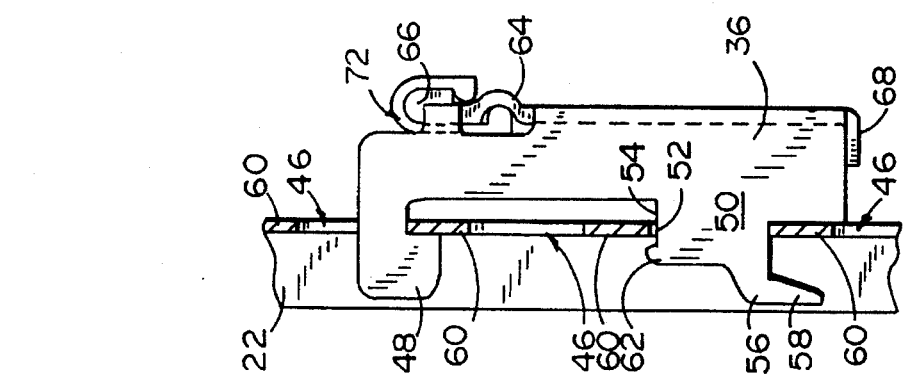
FIG. 5 is an end elevational view similar to FIG. 4 showing an alternative shelf rail end mounted on a typical shelf track of the type used in refrigerator/freezer compartments.

In each embodiment, shelf rail 20 is also formed with a stiffening ridge 64 extending between flanges 36 and 38 and projecting generally away from the mounting hooks 40, 42 (FIG. 4) or 48, 50 (FIG. 5). Alternatively, as explained below, in connection with rail embodiment 90, an indented stiffening dimple or channel may be used. Ridge 64 is most preferably positioned near, but spaced from, a top edge 66 of shelf rail 20. Top edge 66 may be formed by folding a portion of rail 20 forward, over upon itself (see FIGS. 3, 4, 5, and 16). Shelf rail 20 is also stiffened by top edge 66 and by forming a flange 68 along a bottom edge of shelf rail 20. Flange 68 projects in the same general direction as flanges 36 and 38 and extends along the length of shelf rail 20. Further, a recess 70 is defined between stiffening ridge 64 and top edge 66.

A rub strip or wear member 72 is preferably provided along the length of top edge 66 of shelf rail 20 (FIGS. 3 and 4). Rub strip 72 may be a generally U-shaped or open-sided channel member having a pair of legs 74 and 76 extending in the same general direction from a bight or web portion 78. Rub strip 72 may be formed from a high density polyethylene (HDPE) plastic, for example, or other suitable material which is Food and Drug Administration (FDA) approved for food contact. Rub strip 72 is preferably sized for a snug slip fit over top edge 66 with top edge 66 seated against the inside surface of bight portion 78 and Shelf rail body 32 extending outwardly from between legs 74 and 76. A ridge 80 and 82 is preferably formed at the end of each leg 74 and 76, respectively, and extends the length of rub strip 72. Each ridge 80 and 82 projects from its respective leg 74 and 76 in a direction generally opposite to and toward the other ridge 82, 80. Further, leg 74 is sized so that ridge 80 aligns with a recess formed on a back side of and corresponding to stiffening ridge 64 while leg 76 is sized to position ridge 82 in recess 70 between stiffening ridge 64 and top edge 66. Rub strip 72 may thus be snapped onto and is removably secured to rail 20.

In an alternative embodiment 90 of shelf rail 20, also preferably made from 14-gauge steel as shown in FIGS. 6–9, a support 92 is bent out of and projects rearwardly from an elongated body 94 of shelf rail 90. Support 92 is sized in length to have a terminal end 96 closely adjacent or just in contact with refrigerator back wall 28 when shelf rail 90 is mounted on shelf tracks 22. Support 92 is located near an inturned flange 68 on bottom edge 98 of shelf rail 90 for supporting rail 90 to resist twisting or racking forces which may be exerted by a partial shelf 26 mounted on shelf rail 90. Elongated stiffening dimples 100 are also preferably provided near a top edge 102 of shelf rail 90. As with shelf rail 20, alternative shelf rail 90 also has a pair of rearwardly extending flanges 104 and 106 located at opposing ends of rail body 94. Each flange 104, 106 may also be configured as discussed in greater detail above for flanges 36 and 38 of shelf rail 20 and shown in FIGS. 4 and 5. As shown in FIGS. 8 and 8A, flanges 104 and 106 may also be configured in a modification of the alternative configuration shown in FIG. 5 for shelf rail 20 by omitting stop 62.

Now turning to partial shelf 26 and generally to FIGS. 1, 10, 11, and 12–12D, partial shelf 26 extends only partially between shelf tracks 22 and may be constructed according to the commonly assigned U.S. patent application Ser. No. 07/665,661, entitled MOLDED REFRIGERATOR SHELF; U.S. patent application Ser. No. 07/721,104, entitled MOLDED REFRIGERATOR SHELF AND SUPPORT BRACKET; and/or U.S. patent application Ser. No. 07/912,778, entitled MOLDED REFRIGERATOR SHELF WITH SNAP-IN SLIDE, each of which is incorporated by reference above. Thus, partial shelf 26 may have a generally planar shelf panel 120, a pair of support brackets 122 and 124 and a molded, resinous perimeter rim 126. Partial shelf 26 is removably mounted on and cantilevered forward from shelf rail 20 (FIG. 1).

Figure 12:
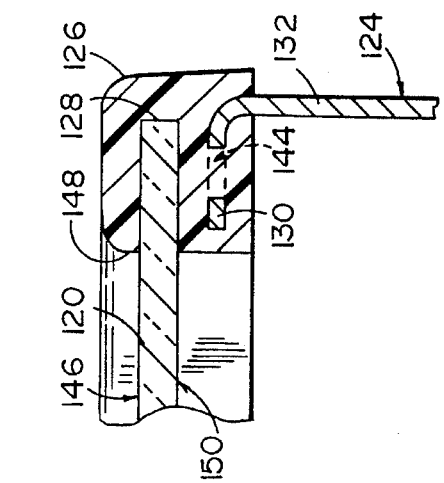
FIG. 12 is a fragmentary, cross-sectional view taken along line XII—XII of FIG. 1.
Figure 11:
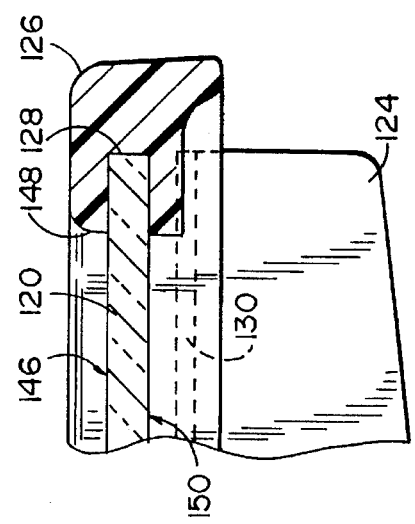
FIG. 11 is a fragmentary, cross-sectional view taken along line XI—XI of FIG. 1.
Figure 9:
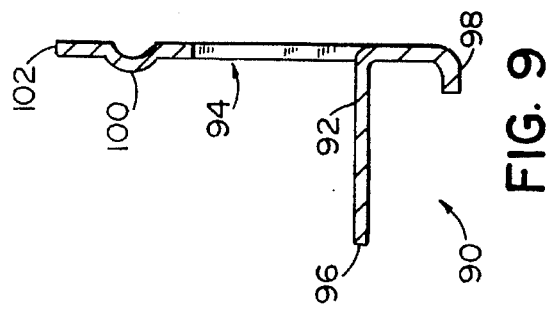
FIG. 9 is a cross-sectional view taken along line IX—IX of FIG. 6.

As is best seen in FIGS. 11 and 12, shelf panel 120 may be a light-transmitting material, preferably optically clear tempered glass, to enhance light distribution through the refrigerator compartment. Shelf panel 120 has a perimeter edge 128 which is supported above brackets 122 and 124 and positioned to overlap above inwardly projecting flange portions 130 of the brackets (FIG. 12). Flange portions 130 project inwardly toward each other from a top edge of generally vertical web portions 132 of each bracket 122 and 124. Thus, bracket 122, positioned along one side of partial shelf 26, is a mirror image of shelf bracket 124 positioned along the opposing side of partial shelf 26 (FIG. 1).

Figure 10:
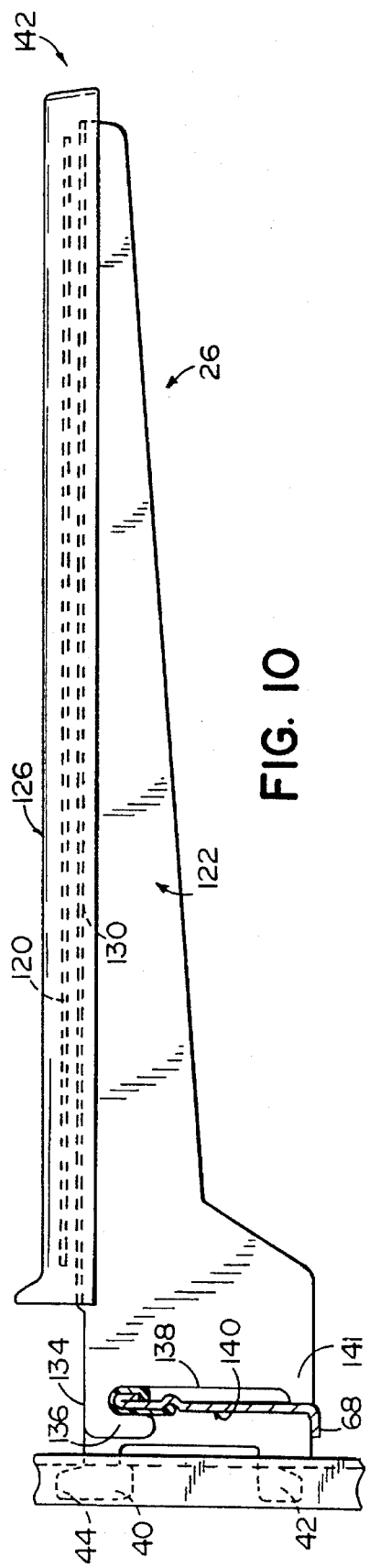
FIG. 10 is a partial sectional and partial side elevational view taken along line X—X of FIG. 1.

Partial shelf 26 releasably engages shelf rail 20. Thus, brackets 122 and 124 are provided with a locking hook 134, having an elongated leg 136 which extends downwardly in generally parallel and spaced relation to a back edge 138 of bracket 122 (FIG. 10). When partial shelf 26 is mounted to rail 20, leg 136 extends a sufficient distance along a side 140 of shelf rail 20, located opposite bracket 122, so that leg 136 bears against side 140. Rail 20 is thus captured between leg 136 and bracket 122 without rail 20 slipping from between leg 136 and bracket 122 to preclude rotation of partial shelf 26 relative to rail 20 when a front edge 142 of partial shelf 26 is slightly lifted for sliding partial shelf 26 along rail 20 as described in greater detail below. Finally, a lower portion 141 of bracket 122 is adapted for abutting engagement with shelf rail 20, near flange 68, to provide cantilever support of partial shelf 26 from shelf rail 20.

Rim 126 is molded around the entire perimeter edge 128 of shelf panel 120 to form a liquid-tight seal between rim 126 and shelf panel 120 and around flanges 130 of brackets 122 and 124 for secure engagement and connection of shelf panel 120 with brackets 122 and 124 (FIGS. 10–12). Each of flanges 130 is most preferably provided with a series of perforations 144 to ensure secure mechanical connection between molded rim 126 and each support bracket 122 and 124 (FIG. 12). During assembly, shelf panel 120 and support brackets 122 and 124 are held and positioned within a mold while a moldable material from which rim 126 is made is injected and flows into the mold, around peripheral edge 128 of shelf panel 120, flanges 130, and through perforations 144, encapsulating perimeter edge 128 and flanges 130. The moldable material of which rim 126 is comprised may include FDA approved copolymer plastics such as a combination of ethylene and polypropylene or other structural plastic such as ABS or polyvinylchloride, for example. Further, an FDA approved coloration pigment may be added to the material used for molding rim 126 prior to molding to provide desired colors for the rim. Titanium dioxide may be added for a white coloration, for example.

As the moldable material cures, i.e. cools, hardens, and sets up, it becomes a tough and resilient mass extending continuously around perimeter edge 128 of shelf panel 120 for holding shelf panel 120 in position above flanges 130 of support brackets 122 and 124. The inward extension of flanges 130 provides secure, stable support for shelf panel 120. Rim 126 is molded to extend above the top surface 146 of shelf panel 120 and is specifically molded to define a continuous vertical wall 148 (FIGS. 11 and 12) near perimeter edge 128 of shelf panel 120 to form a spill dam for containing spills which may occur upon shelf panel 120.

While the seal formed between rim 126 and shelf panel 120 by molding rim 126 around shelf panel 120 performs quite satisfactorily, depending upon the specific rim material chosen, one may enhance the seal by coating perimeter edge 128 and adjoining top 146 and bottom 150 surfaces of shelf panel 120, adjacent perimeter edge 128, prior to molding rim 126 thereabout, with a primer layer or coating of a heat-activatable material which promotes and facilitates adhesion and bonding of the rim material to shelf panel 120.

Figure 12B:
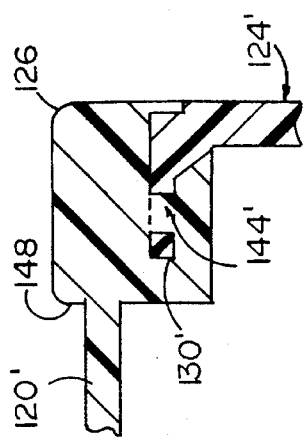
FIG. 12B is a fragmentary, cross-sectional view of a shelf similar to that in FIG. 12, but showing a plastic shelf support bracket and the perimeter rim molded in one piece with a plastic shelf panel.
Figure 12D:
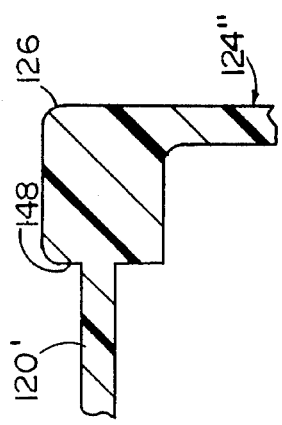
FIG. 12D is a fragmentary, cross-sectional view of a shelf similar to that in FIG. 12, but showing the perimeter rim, a plastic shelf support bracket, and a plastic shelf panel all molded in one piece.
Figure 12A:
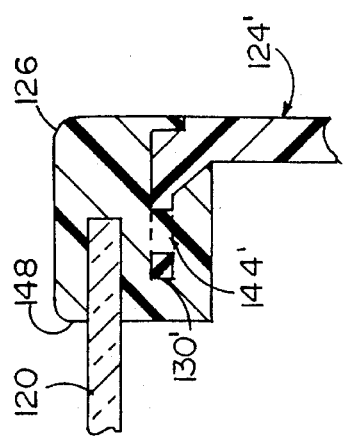
FIG. 12A is a fragmentary, cross-sectional view of a shelf similar to that in FIG. 12, but showing a plastic shelf support bracket.
Figure 12C:
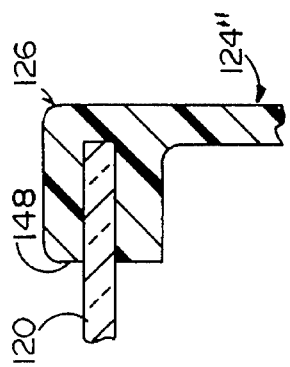
FIG. 12C is a fragmentary, cross-sectional view of a shelf similar to that in FIG. 12, but showing the perimeter rim molded in one piece with a plastic shelf support bracket.

While the shelf support brackets 122 and 124 discussed above may be metal brackets as is shown in FIG. 12 and formed from a steel, aluminum, or other metal as is commonly known for adjustable shelf support brackets, shelf support brackets 122 and 124 may also be separate molded plastic members 124' as shown in FIGS. 12A and 12B and discussed in commonly assigned U.S. patent application Ser. No. 07/721,104, entitled MOLDED REFRIGERATOR SHELF AND SUPPORT BRACKET and incorporated by reference above. Further, shelf support brackets 124" may also be integrally molded with perimeter rim 126 as shown in FIGS. 12C and 12D. Further yet, shelf panel 120' may also be a separate molded member or may be molded in one piece with perimeter rim as shown in FIGS. 12B and 12D and discussed in commonly assigned U.S. patent application Ser. No. 07/912,778, entitled MOLDED REFRIGERATOR SHELF WITH SNAP-IN SLIDE and incorporated by reference above. FIG. 12D is noted as showing all of the shelf panel, perimeter rim, and shelf support bracket molded in one piece from the same molded plastic material as discussed above.

Full shelf 24 extends fully between and mounts directly on shelf tracks 22 (FIG. 1). Further, full shelf 24 may have a construction substantially similar to partial shelf 26 as discussed in detail above. However, instead of a hook 134 and leg 136 as on partial width shelf 26, full shelf 24 preferably includes one of the embodiments of the hooks and flanges shown and described in FIGS. 4–8A and 16–19 above.

Figure 13:
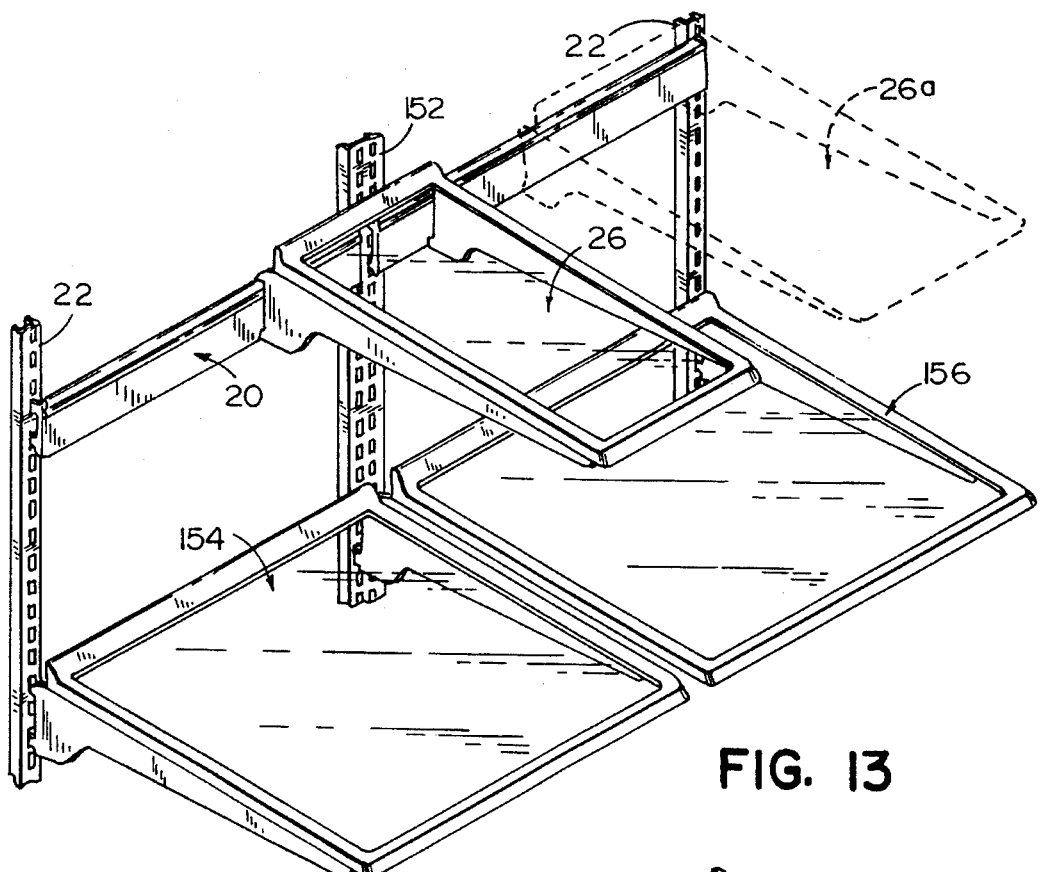
FIG. 13 is a perspective view of a second refrigerator shelf arrangement according to the present invention.

As shown in FIGS. 13 and 15, shelf rail 20 may also be used in a second shelving arrangement wherein the full width of the refrigerated compartment is divided into left and right portions by a "center" shelf track 152. In these arrangements, centered shelf track 152 may be actually centered between the outer shelf tracks 22 with shelves 154 and 156 extending between one of the outer shelf tracks 22 and the center shelf track 152. Alternatively, center shelf track 152 may be positioned nearer to one of shelf tracks 22 and further from the other of shelf tracks 22. Further, center shelf track 152 may comprise one shelf track, similar or identical to each shelf track 22; a pair of shelf tracks, similar or identical to each shelf track 22, positioned next to one another; a single, double wide shelf track 152 having aligned pairs of slots or holes for receiving hooks on support brackets as described and shown; or a single shelf track with wide slots adapted to receive two rails 20 or two brackets 30.

In the second shelving arrangement (FIG. 13), shelf rails 20 may be staggered vertically, supporting partial shelves 26 according to a user's requirements (FIG. 15). Two shelf rails 20 may also be positioned in line with one another as specifically shown in FIG. 13 so that a partial shelf 26 may be positioned to straddle center shelf track 152.

Figure 14:
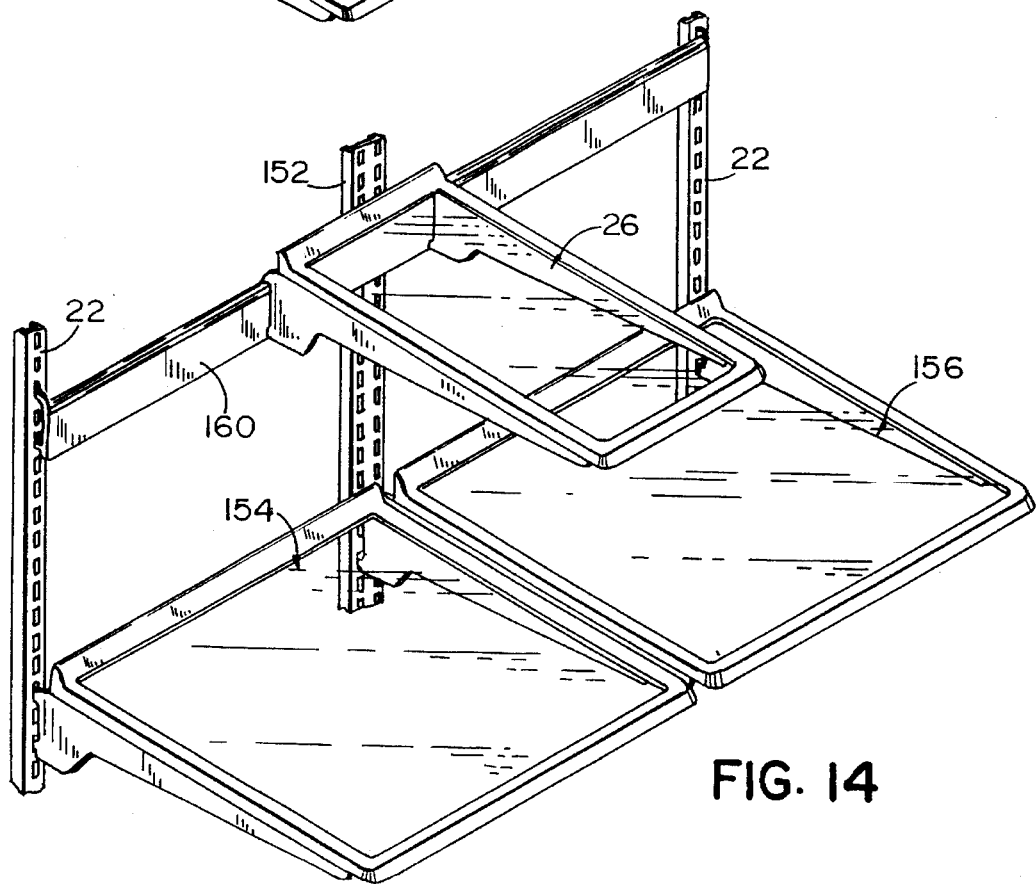
FIG. 14 is a perspective view of a third refrigerator shelf arrangement similar to that in FIG. 13, but showing an alternative embodiment of the shelf rail.
Figure 16:
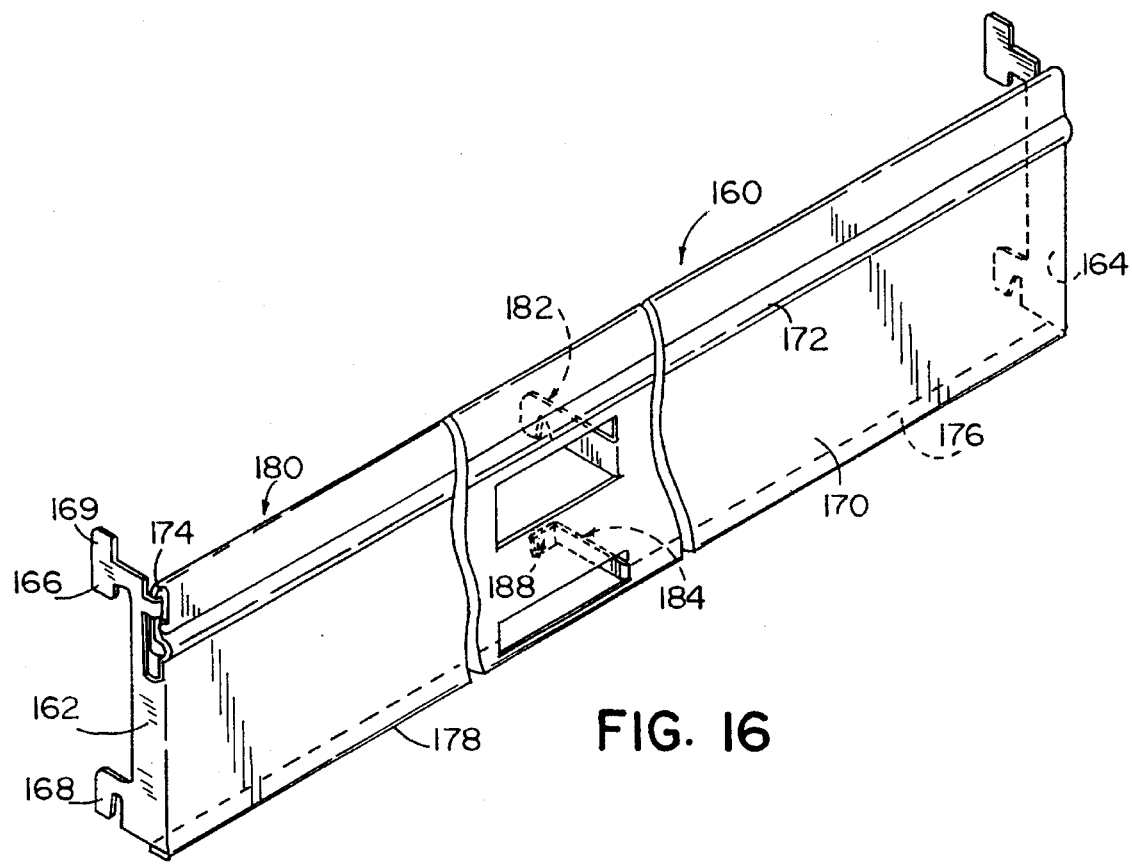
FIG. 16 is a perspective view of a third, extended length embodiment of a shelf rail according to the present invention.

Alternatively, as specifically shown in FIG. 14, a single, extended length shelf rail 160, also preferably formed from 14-gauge steel, may be used to span the full width of the refrigerated compartment, overlaying center shelf track 152 and mounting at its ends to shelf tracks 22. Thus, shelf rail 160 is most preferably configured virtually identically to shelf rail 20 with an elongated body 170 and rearwardly extending flanges 162 and 164 at each of two opposing ends (FIGS. 16–18). Likewise, each flange 162, 164 is most preferably provided with a pair of mounting hooks 166 and 168 for engaging the slots 46 provided in shelf tracks 22 and a positive locking tab 169 as previously discussed above regarding shelf rail 20 and FIG. 4. Further, each of the alternative rail end configurations also discussed above regarding FIGS. 5 and 8 may also be incorporated into rail 160.

Shelf rail 160 also includes an elongated body 170 having a stiffening ridge 172 extending along the length of body 170 and located near a top edge 174 of shelf rail 160. Top edge 174 is preferably formed by bending or folding over a portion of body 170 upon itself, also as discussed above regarding top edge 66 of shelf rail 20. Top edge 174 thus provides additional stiffness to shelf rail 160 as does a flange 176 formed along a bottom edge 178 of shelf rail 160. Further, a wear member or rub strip 180 as discussed in greater detail above is preferably provided on and extends along the length of top edge 174 of shelf rail 160.

Figure 19:
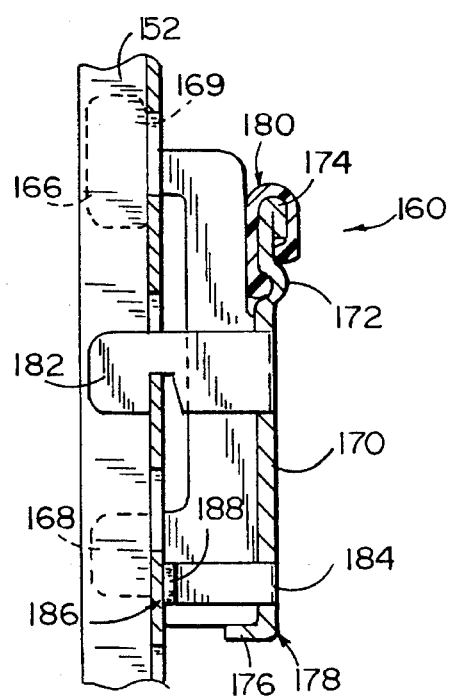
FIG. 19 is a cross-sectional view along line XV—XV of FIG. 17.

Other than the extended length of shelf rail 160, the only distinction between shelf rail 160 and shelf rail 20 is a provision in elongated body 170 of shelf rail 160 for interconnection of shelf rail 160 with center shelf track 152 (FIGS. 16 and 19). Specifically, a mounting hook 182 is bent rearwardly from body 170 for engagement with center shelf track 152. Mounting hook 182 is therefore positioned for alignment with a slot 46 in center shelf track 152. A support leg 184 is also provided and positioned in vertical alignment with mounting hook 182 and spaced vertically below mounting hook 182. While support leg 184 may be configured in a number of forms, including forms which engage a slot 46 in center shelf track 152, support leg 184 is most preferably configured for abutting engagement with center shelf track 152. Support leg 184 may thus be formed with a length sized for a terminal end 186 to abut center shelf track 152 and is most preferably formed with a laterally extending, terminal end flange 188 positioned for abutting engagement with center shelf track 152. With the combination of mounting hook 182 and support leg 184 engaging center shelf track 152, shelf rail 160 is strengthened to resist twisting or racking forces which may be exerted by a partial shelf 26 mounted on shelf rail 160 and loaded.

In an alternative embodiment 190 (FIG. 20) of shelf rail 160, preferably formed from 14-gauge steel, a pair of spaced supports 192 are bent out of and project generally rearwardly from the metal body portion 194 of the shelf rail 190. In a similar manner as for support 92 having end 96 in shelf rail 90, each support 192 is sized in length to have a terminal end closely adjacent or just in contact with refrigerator back wall 28 when shelf rail 190 is mounted on shelf tracks 22. Supports 192 thus support shelf rail 190 against twisting or racking forces as discussed in greater detail above regarding shelf rail 90. As with the previous embodiments of the shelf rail, any of the mounting hook embodiments 40 and 42, 48 and 50, or 166 and 168 can be used on rail 190.

In use, a shelf rail 20 may be mounted to a pair of adjustable shelf tracks 22 (FIGS. 1 and 2) or to an adjustable shelf track 22 and a center shelf track 152 (FIGS. 13 and 15) by inserting positive locking tabs 44 at each end of shelf rail 20 into a cooperating slot 46 of the adjustable shelf tracks (FIG. 4). With tabs 44 so engaged, shelf rail 20 may be rotated in a generally downward direction for insertion of mounting hooks 42 through corresponding slots 46 spaced generally vertically downwardly from the slots 46 which receive tabs 44. With tabs 44 and hooks 42 so engaged in corresponding slots 46, shelf rail 20 may be slid generally downwardly for each of mounting hooks 40 and 42 to engage a cooperating rung 60.

With shelf rail 20 mounted on the respective shelf tracks 22 and 152, a partial shelf 26 may be hung or mounted on shelf rail 20 simply by positioning leg 136 of each bracket 122 and 124 to insert wear member 72 and top edge 66 of shelf rail 20 between leg 136 and bracket back edge 138. With locking hook 134 and shelf rail 20 so engaged, lower bracket portion 141 will abut Shelf rail 20 near flange 68 for cantilever support of partial shelf 26 from shelf rail 20. A generally upward force applied at front edge 142 (FIG. 10) of partial shelf 26 will release bracket lower portion 141 from abutting shelf rail 20 and allow lateral sliding of locking hook 134 along wear member 72 for lateral positioning of partial shelf 26 along the length of shelf rail 20.

In similar fashion, shelf rail 160 may be mounted to adjustable shelf tracks 22 with mounting hook 182 engaging center shelf track 152 and support leg 184 abutting center shelf track 152 (FIG. 19). Further, partial shelf 26 may similarly be releasably mounted on shelf rail 160.

The above description is considered that of the preferred embodiments only. Modifications of the invention, including, but not limited to, extending bracket lower portion 141 (FIG. 10) to extend around flange 68 for example, or full width shelves 24, 154, 156 having a width greater than the spacing between shelf tracks 22, such as across the entire refrigerator compartment, or shelf rails 20, 90, 160 or 190 extending beyond shelf tracks 22 if those tracks are not mounted at the extreme edges of the refrigerator compartment, will occur to those skilled in the art and to those who practice the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A refrigerator comprising:

a compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track being adapted to couple in releasable supporting engagement with a number of support brackets at a plurality of vertically spaced locations;

first shelving in said compartment, extending substantially across said width between said first and second shelf tracks, having a support bracket coupled with said first shelf track, and having another support bracket coupled with said second shelf track;

a shelf rail in said compartment, extending at least fully across said width between said first and second shelf tracks, said shelf rail having an elongated body with integral coupling portions engaging said first shelf track and said second shelf track, said shelf rail being vertically spaced from said first shelving; and a partial shelf in said compartment, said partial shelf extending less than fully across said width between said first and second shelf tracks, said partial shelf having support members coupling said partial shelf with said shelf rail, said shelf rail having a cooperating support engaging said support members to support said partial shelf.

2. The refrigerator defined in claim 1, wherein said integral coupling portions are rigidly, non-releasably mounted on said body of said shelf rail, said integral coupling portions extending toward said first and second shelf tracks from said body of said shelf rail and engaging said first and second shelf tracks.

3. The refrigerator defined in claim 2 wherein said coupling portions include a first hook with a leg releasably engaging said first shelf track and a second hook with a leg releasably engaging said second shelf track, said first hook and said second hook being spaced along a length of said shelf rail.

4. The refrigerator defined in claim 3 wherein one of said first hook and said second hook includes a tab extending in a direction generally opposite to said leg, said one of said first hook and said second hook engaging a corresponding one of said first shelf track and said second shelf track, said tab engaging said corresponding one of said first shelf track and said second shelf track to lock said one of said first hook and said second hook in engagement with said corresponding one of said first shelf track and said second shelf track.

5. The refrigerator defined in claim 4 wherein:

said shelf rail is rotatable about an axis of rotation to couple said shelf rail with and to disengage said shelf rail from each of said first and second shelf tracks, said axis of rotation extending generally along said length of said shelf rail; and said tab includes a stop member, said stop member releasably engaging said corresponding one of said first shelf track and said second shelf track to limit rotation of said shelf rail to a position in which said tab is disengaged from and adjacent to said corresponding one of said first shelf track and said second shelf track.

6. The refrigerator defined in claim 3 wherein each of said first hook and said second hook includes a tab extending in a direction generally opposite to said leg, each of said first hook and said second hook engaging a corresponding one of said first shelf track and said second shelf track, each said tab engaging said corresponding one of said first shelf track and said second shelf track to lock each of said first hook and said second hook in engagement with said corresponding one of said first shelf track and said second shelf track, each said tab including a stop member, each said stop member engaging said corresponding one of said first shelf track and said second shelf track to limit rotation of said shelf rail to a position in which each said tab is disengaged from and adjacent to said corresponding one of said first shelf track and said second shelf track.

7. The refrigerator defined in claim 1 wherein said partial shelf support members and said cooperating support of said shelf rail releasably engage to support and cantilever said partial shelf.

8. The refrigerator defined in claim 7 wherein said partial shelf engages said shelf rail at a plurality of horizontal locations.

9. The refrigerator defined in claim 1 wherein said partial shelf engages said shelf rail at a plurality of horizontal locations.

10. The refrigerator defined in claim 9 wherein said partial shelf has at least one locking hook releasably engaging said shelf rail.

11. The refrigerator defined in claim 10 wherein said locking hook has an elongated leg defining a space between said leg and said partial shelf to receive a portion of said shelf rail, said leg extending along and adjacent to a side of said shelf rail opposite said partial shelf, said leg bearing against said side to limit rotation of said partial shelf relative to said shelf rail.

12. The refrigerator defined in claim 9 further including a wear member interposed between said partial shelf and said shelf rail.

13. The refrigerator defined in claim 9 further including a wear member interposed between said partial shelf and said shelf rail.

14. The refrigerator defined in claim 1 further including a third shelf track, said third shelf track being generally parallel to and positioned in horizontally spaced relation to said second shelf track, opposite said first shelf track, to define a first width between said first shelf track and said second shelf track and a second width between said second shelf track and said third shelf track, said third shelf track being adapted to couple in releasable supporting engagement with said number of support brackets at said plurality of vertically spaced locations; and wherein said shelf rail extends at least fully across said first width and said second width, said shelf rail including projecting members to releasably engage at least said first shelf track and said third shelf track.

15. The refrigerator defined in claim 1 wherein said partial shelf has at least one locking hook releasably engaging said shelf rail, said locking hook having an elongated leg defining a space between said leg and said partial shelf to receive a portion of said shelf rail, said leg extending along and adjacent to a side of said shelf rail opposite said partial shelf, said leg bearing against said side to limit rotation of said partial shelf relative to said shelf rail.

16. In a refrigerator having a refrigerated compartment with at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations, the improvement of refrigerator shelving comprising the combination of:

a full shelf extending at least fully across said width between said first and second shelf tracks, said full shelf having a support bracket coupled with at least one of said first shelf track and said second shelf track to support said full shelf;

a shelf rail mounted on said first and second shelf tracks and extending at least fully across said width between said first and second shelf tracks, said shelf rail including projecting members for releasable engagement with said first and second shelf tracks at said plurality of vertically spaced locations, said shelf rail having an elongated body, said projecting members extending from said elongated body and having a first hook for releasable engagement with said first shelf track and a second hook for releasable engagement with said second shelf track, said second hook being spaced along a length of said shelf rail from said first hook;

a partial shelf mounted on said shelf rail, said partial shelf extending less than fully across said width between said first and second shelf tracks, said full shelf being in vertically spaced relation to said partial shelf when mounted on said shelf rail, said partial shelf being cantilevered from said shelf rail and including releasable engagement members for releasably engaging said shelf rail, said shelf rail having means for cooperating releasable engagement with said releasable engagement members of said partial shelf, said partial shelf engaging said shelf rail at a plurality of horizontal locations; and a wear member interposed between said partial shelf and said shelf rail, said shelf rail having a top edge extending substantially along said length of said shelf rail, said wear member defining an open-sided channel extending along said top edge, said shelf rail extending through said open side with said top edge seated within said channel.

17. The refrigerator defined in claim 16 wherein said partial shelf has:

a shelf panel with a top surface for receiving and supporting an article set thereupon and a perimeter edge thereabout;

a rim molded from a resinous material about said perimeter edge to provide a liquid-tight seal between said shelf panel and said rim, said liquid-tight seal being formed during molding; and at least one support bracket for supporting said partial shelf.

18. The refrigerator defined in claim 17 wherein said rim projects above said top surface to define a spill dam whereby a liquid disposed upon said top surface is contained by said rim and does not flow around said edge of said shelf panel.

19. The refrigerator defined in claim 18 wherein said rim is molded around at least a portion of said support bracket so that said shelf member and said support bracket are secured together by said rim.

20. The refrigerator defined in claim 17 wherein said refrigerator further includes a third shelf track, said third shelf track being generally parallel to and positioned in horizontally spaced relation to said second shelf track on the opposite side of said second shelf track from said first shelf track to define a first width between said first shelf track and said second shelf track and a second width between second shelf track and said third shelf track, said third shelf track being adapted for releasable engagement with said number of support brackets at said plurality of vertically spaced locations; and wherein said shelf rail extends across said first width and said second width, said shelf rail having at least a third hook for releasable engagement with said third shelf track, said third hook being spaced along said length of said shelf rail from said first hook and said second hook.

21. A refrigerator comprising:

a refrigerated compartment;

at least a first shelf track and a second shelf track mounted in said refrigerated compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilever support of a number of shelves at a plurality of vertically spaced locations;

a shelf rail in said refrigerated compartment, said rail extending at least fully across said width between said first and second shelf tracks, said shelf rail having an elongated body with integral rigid coupling members engaging said first shelf track and said second shelf track in releasable supporting engagement, said coupling members being spaced along a length of said shelf rail; and a partial shelf releasably supported by said shelf rail in said refrigerated compartment, said partial shelf having a width less than said width between said first and second shelf tracks, and being supported by said shelf rail, said partial shelf further including a shelf panel with a top surface for receiving and supporting an article thereon and a peripheral edge thereabout, a rim molded from a moldable material along said perimeter edge to define a spill dam to contain any liquid disposed on said shelf panel, and a support engaging said shelf rail for supporting said shelf panel on said shelf rail, said partial shelf also having at least one locking hook releasably engaging said shelf rail, said locking hook having an elongated leg defining a space between said leg and said partial shelf to receive a portion of said shelf rail, said leg extending along and adjacent to a side of said shelf rail opposite said partial shelf, said leg bearing against said side to limit rotation of said partial shelf relative to said shelf rail.

22. In a refrigerator having a refrigerated compartment with at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations, the improvement of refrigerator shelving comprising the combination of:

a full shelf extending at least fully across said width between said first and second shelf tracks, said full shelf having at least one support bracket coupled with at least one of said first shelf track and said second shelf track to support said full shelf;

a shelf rail mounted on said first and second shelf tracks and extending at least fully across said width between said first and second shelf tracks; and a partial shelf mounted on said shelf rail, said partial shelf extending less than fully across said width between said first and second shelf tracks, said full shelf being in vertically spaced relation to said partial shelf when mounted on said shelf rail, said partial shelf having a shelf panel with a top surface for receiving and supporting an article set thereupon and a perimeter edge thereabout, having a rim molded from a resinous material about said perimeter edge to provide a liquid-tight seal between said shelf panel and said rim, said liquid-tight seal being formed during molding, and having at least one support bracket for supporting said partial shelf.

23. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilever support of a number of shelves at a plurality of vertically spaced locations;

a shelf rail in said compartment, said rail extending at least fully across said width between said first and second shelf tracks, said shelf rail having an elongated body with integral rigid coupling members engaging said first shelf track and said second shelf track in releasable supporting engagement, said coupling members being spaced along a length of said shelf rail; and a partial shelf in said compartment, said partial shelf having a width less than said width between said first and second shelf tracks, and being releasably supported by said shelf rail; and a wear member interposed between said partial shelf and said shelf rail.

24. In a refrigerator having a refrigerated compartment with at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations, the improvement of refrigerator shelving comprising the combination of:

a full shelf extending at least fully across said width between said first and second shelf tracks, said full shelf having at least one support bracket coupled with at least one of said first shelf track and said second shelf track to support said full shelf;

a third shelf track, said third shelf track being generally parallel to and positioned in horizontally spaced relation to said second shelf track on a side of said second shelf opposite said first shelf track to define a first width between said first shelf track and said second shelf track and define a second width between said second shelf track and said third shelf track, said third shelf track being adapted for releasable engagement with said number of support brackets at said plurality of vertically spaced locations;

a shelf rail mounted on said first and third shelf tracks and extending at least fully across said first width between said first shelf track and said second shelf track, and said second width between said second shelf track and said third shelf track, said shelf rail including projecting members for releasable engagement with at least said first shelf track and said third shelf track; and a partial shelf mounted on said shelf rail, said partial shelf extending less than fully across said first width between said first shelf track and said second shelf track, said full shelf being in vertically spaced relation to said partial shelf mounted on said shelf rail, said partial shelf having a shelf panel with a top surface for receiving and supporting an article set thereupon and a perimeter edge thereabout; having a rim molded from a resinous material about said perimeter edge to provide a liquid-tight seal between said shelf panel and said rim, said liquid-tight seal being formed during molding, and having at least one support bracket for supporting said partial shelf.

25. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations;

a refrigerator shelving shelf rail having an elongated body extending at least fully across said width between said first and second shelf tracks, said body including a first rigid portion releasably engaging said first shelf track, a second rigid portion spaced along a length of said shelf rail from said first rigid portion and releasably engaging said second shelf track, an upper edge and a lower edge extending along a length of said shelf rail, a generally vertical surface extending between said upper and lower edges and first and second rigid portions, a stiffener extending along said length of said shelf rail in said generally vertical surface intermediate said upper and lower edges, and a support along said length of said shelf rail to receive and support a shelf, said support including at least portions of said upper edge and said generally vertical support surface.

26. The refrigerator defined in claim 25 wherein said first rigid portion has at least a first hook with a leg releasably engaging said first shelf track, and wherein said second rigid portion has at least a second hook with a leg releasably engaging said second shelf track.

27. The refrigerator defined in claim 26 wherein one of said first hook and said second hook includes a tab extending in a direction generally opposite to said leg, said first tab engaging a corresponding one of said first shelf track and said second shelf track to lock said one of said first hook and said second hook in engagement with said corresponding one of said first shelf track and said second shelf track.

28. The refrigerator defined in claim 27 wherein:

said shelf rail is rotatable about an axis of rotation to couple said shelf rail with and to disengage said shelf rail from each of said first and second shelf tracks, said axis of rotation extending generally along said length of said shelf rail; and said tab includes a stop hook, said stop hook releasably engaging said corresponding one of said first shelf track and said second shelf track to limit rotation of said shelf rail to a position in which said tab is disengaged from and adjacent to said corresponding one of said first shelf track and said second shelf track.

29. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations;

a refrigerator shelving shelf rail having an elongated body extending at least fully across said width between said first and second shelf tracks, said body including a first rigid portion releasably engaging said first shelf track, including a second rigid portion spaced along a length of said shelf rail from said first rigid portion and releasably engaging said second shelf track, including a stiffener extending along said length of said shelf rail, and including a support along said length to receive and support a shelf;

said first rigid portion having at least a first hook with a leg releasably engaging said first shelf track; said second rigid portion having at least a second hook with a leg releasably engaging said second shelf track;

each of said first hook and said second hook including a tab extending in a direction generally opposite to said leg, each of said first hook and said second hook engaging a corresponding one of said first shelf track and said second shelf track, each said tab engaging said corresponding one of said first shelf track and said second shelf track to lock each of said first hook and said second hook in engagement with said corresponding one of said first shelf track and said second shelf track, each said tab including a stop hook, each said stop hook releasably engaging said corresponding one of said first shelf track and said second shelf track to limit rotation of said shelf rail to a position in which said tab is disengaged from and adjacent to said corresponding one of said first shelf track and said second shelf track.

30. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilever support of a number of shelves at a plurality of vertically spaced locations;

a shelf rail in said compartment, said rail extending at least fully across said width between said first and second shelf tracks, said shelf rail having an elongated body with integral, rigid coupling members engaging said first shelf track and said second shelf track in releasable supporting engagement, said coupling members being spaced along a length of said shelf rail;

said coupling members including at least a first hook with a leg releasably engaging said first shelf track, and at least a second hook with a leg releasably engaging said second shelf track, said first hook and said second hook being spaced along said length of said shelf rail;

a partial shelf in said compartment, said partial shelf having a width less than said width between said first and second shelf tracks, and being releasably supported by said shelf rail, said partial shelf having at least one locking hook releasably engaging said shelf rail; and a wear member interposed between said partial shelf and said shelf rail.

31. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations;

a refrigerator shelving shelf rail having an elongated body extending at least fully across said width between said first and second shelf tracks, said body including a first rigid portion releasably engaging said first shelf track, including a second rigid portion spaced along a length of said shelf rail from said first rigid portion and releasably engaging said second shelf track, including a stiffener extending along said length of said shelf rail, and including a support along said length to receive and support a shelf;

said first rigid portion having at least a first hook with a leg releasably engaging said first shelf track; said second rigid portion having at least a second hook with a leg releasably engaging said second shelf track;

a partial shelf, said partial shelf extending less than fully across said width between said first shelf track and said second shelf track, said partial shelf including support members, said support members releasably engaging said shelf rail, said support of said shelf rail cooperating in releasable engagement with said support members of said partial shelf to support said partial shelf.

32. The refrigerator defined in claim 31 wherein said shelf rail receives said partial shelf at a plurality of horizontal locations.

33. The refrigerator defined in claim 32 wherein a wear member is interposed between said partial shelf and said shelf rail.

34. The refrigerator shelving shelf rail defined in claim 33 wherein said shelf rail has a top edge extending substantially along said length of said shelf rail and wherein said wear member defines an open-sided channel extending along said top edge, said shelf rail extending through said open side of said wear member with said top edge of said shelf rail seated within said channel.

35. The refrigerator defined in claim 32 wherein said refrigerator further includes a third shelf track, said third shelf track being generally parallel to and positioned in horizontally spaced relation to said second shelf track, opposite said first shelf track, to define a first width between said first shelf track and said second shelf track and a second width between said second shelf track and said third shelf track, said third shelf track being adapted to couple in releasable supporting engagement with said number of support brackets at said plurality of vertically spaced locations; wherein said shelf rail extends at least fully across said first width and said second width; and wherein said shelf rail has at least a third hook with a leg releasably engaging said third shelf track, said third hook being spaced along said length of said shelf rail from each of said first hook and said second hook.

36. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations;

a refrigerator shelving shelf rail having an elongated body extending at least fully across said width between said first and second shelf tracks, said body including a first rigid portion releasably engaging said first shelf track, including a second rigid portion spaced along a length of said shelf rail from said first rigid portion and releasably engaging said second shelf track, including a stiffener extending along said length of said shelf rail, and including a support along said length to receive and support a shelf; and a partial shelf, said partial shelf extending less than fully across said width between said first shelf track and said second shelf track, said partial shelf including support members, said support members releasably engaging said shelf rail, said support of said shelf rail cooperating in releasable engagement with said support members of said partial shelf to support said partial shelf.

37. The refrigerator defined in claim 36 wherein said shelf rail releasably receives said partial shelf at a plurality of horizontal locations.

38. The refrigerator defined in claim 36 wherein a wear member is interposed between said partial shelf and said shelf rail.

39. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilevered support of a number of shelves at a plurality of vertically spaced locations;

a refrigerator shelving shelf rail having an elongated body extending at least fully across said width between said first and second shelf tracks, said body including a first rigid portion releasably engaging said first shelf track, including a second rigid portion spaced along a length of said shelf rail from said first rigid portion and releasably engaging said second shelf track, including a stiffener extending along said length of said shelf rail, and including a support along said length to receive and support a shelf; and said refrigerator further including a third shelf track, said third shelf track being generally parallel to and positioned in horizontally spaced relation to said second shelf track, opposite said first shelf track, to define a first width between said first shelf track and said second shelf track and a second width between said second shelf track and said third shelf track, said third shelf track being adapted to couple in releasable supporting engagement with said number of support brackets at said plurality of vertically spaced locations; wherein said shelf rail extends at least fully across said first width and said second width; and wherein said shelf rail has a third rigid portion releasably engaging said third shelf track, said third rigid portion being spaced along said length of said shelf rail from each of said first rigid portion and said second rigid portion.

40. A refrigerator comprising:

a refrigerated compartment;

at least a first shelf track and a second shelf track mounted in said compartment, each of said first shelf track and said second shelf track being generally vertically oriented in horizontally spaced relation to each other and defining a width therebetween, each of said first shelf track and said second shelf track also being adapted for releasable supporting engagement with a number of support brackets for cantilever support of a number of shelves at a plurality of vertically spaced locations;

a shelf rail in said compartment, said rail extending at least fully across said width between said first and second shelf tracks, said shelf rail having an elongated body with integral, rigid coupling members engaging said first shelf track and said second shelf track in releasable supporting engagement, said coupling members being spaced along a length of said shelf rail; and a partial shelf in said compartment, said partial shelf having a width less than said width between said first and second shelf tracks, and being releasably supported by said shelf rail, said partial shelf further including a shelf panel with a top surface for receiving and supporting an article thereon and a peripheral edge thereabout, a rim molded from a moldable material along said perimeter edge to define a spill dam to contain any liquid disposed on said shelf panel, and a support engaging said shelf rail for supporting said shelf panel on said shelf rail.

41. The refrigerator defined in claim 40 wherein, said coupling members include at least a first hook with a leg releasably engaging said first shelf track, and at least a second hook with a leg releasably engaging said second shelf track, said first hook and said second hook being spaced along said length of said shelf rail.

42. The refrigerator defined in claim 41 wherein one of said first hook and said second hook includes a tab extending in a direction generally opposite to said leg, said one of said first hook and said second hook engaging a corresponding one of said first shelf track and said second shelf track, said tab engaging said corresponding one of said first shelf track and said second shelf track to lock said one of said first hook and said second hook in engagement with said corresponding one of said first shelf track and said second shelf track.

43. The refrigerator defined in claim 42 wherein:

said shelf rail is rotatable about an axis of rotation to couple said shelf rail with and to disengage said shelf rail from each of said first and second shelf tracks, said axis of rotation extending generally along said length of said shelf rail; and said tab includes a stop hook, said stop hook releasably engaging said corresponding one of said first shelf track and said second shelf track to limit rotation of said shelf rail to a position in which said tab is disengaged from and adjacent to said corresponding one of said first shelf track and said second shelf track.

44. The refrigerator shelving defined in claim 41 wherein each of said first hook and said second hook includes a tab extending in a direction generally opposite to said leg, each of said first hook and second hook engaging a corresponding one of said first shelf track and said second shelf track, each said tab engaging said corresponding one of said first shelf rail and said second shelf rail to lock each of said first hook and said second hook in engagement with said corresponding one of said first shelf track and said second shelf track, each said tab including a stop hook, each said stop hook releasably engaging said corresponding one of said first shelf track and said second shelf track to limit rotation of said shelf rail to a position in which each said tab is disengaged from and adjacent to said corresponding one of said first shelf track and said second shelf track.

45. The refrigerator defined in claim 41 wherein said refrigerator further includes a third shelf track, said third shelf track being generally parallel to and positioned in horizontally spaced relation to said second shelf track, opposite said first shelf track, to define a first width between said first shelf track and said second shelf track and a second width between said second shelf track and said third shelf track, said third shelf track being adapted to couple in releasable supporting engagement with said number of support brackets at said plurality of vertically spaced locations; wherein said shelf rail extends at least fully across said first width and said second width; and wherein said coupling members include at least a third hook with a leg releasably engaging said third shelf track, said third hook being spaced along said length of said shelf rail from each of said first hook and said second hook.

46. The refrigerator defined in claim 41 wherein said partial shelf has at least one locking hook releasably engaging said shelf rail.

47. The refrigerator defined in claim 46 wherein said locking hook has an elongated leg defining a space between said leg and said partial shelf to receive a portion of said shelf rail, said leg extending along and adjacent to a side of said shelf rail opposite said partial shelf, said leg bearing against said side to limit rotation of said partial shelf relative to said shelf rail.

48. The refrigerator defined in claim 40 wherein said refrigerator further includes a third shelf track, said third shelf track being generally parallel to and positioned in horizontally spaced relation to said second shelf track, opposite said first shelf track, to define a first width between said first shelf track and said second shelf track and a second width between said second shelf track and said third shelf track, said third shelf track being adapted to couple in releasable supporting engagement with said number of support brackets at said plurality of vertically spaced locations; and wherein said shelf rail extends at least fully across said first width and said second width, said coupling members of said shelf rail coupling in releasable engagement with at least said first shelf track and said third shelf track.

49. In a refrigerator having a refrigerated compartment with at least a first shelf track and a second shelf track mounted in said compartment, each of said first shelf track and said second shelf track being generally vertically oriented in horizontal spaced relation to each other defining a width therebetween, each of said first shelf track and said second shelf track being adapted for releasable engagement with a number of support brackets for cantilever support of a number of shelves at a plurality of vertically spaced locations, the improvement of refrigerator shelving comprising the combination of:

a shelf rail mounted on said first and said second shelf tracks and extending at least fully across said width between said first and second shelf tracks; and a partial shelf mounted on said shelf rail, said partial shelf extending less than fully across said width between said first and second shelf tracks said partial shelf having a shelf panel with a top surface for receiving and supporting an article set thereupon and a perimeter edge thereabout, having a rim molded from a resinous material about said perimeter edge to provide a liquid-tight seal between said shelf panel and said rim, said liquid-tight seal being formed during molding, and having at least one support bracket for supporting said partial shelf.

50. The refrigerator defined in claim 49 wherein said rim projects above said top surface to define a spill dam so that a liquid disposed upon said top surface is contained by said rim and does not flow around the edge of said shelf panel.

51. The refrigerator defined in claim 50 wherein said rim is molded around at least a portion of said support bracket so that said shelf member and said support bracket are secured together by said rim.

* * * * *